United States Patent [19]

Ernst et al.

[11] Patent Number: 5,296,027

[45] Date of Patent: Mar. 22, 1994

[54] SINGLE-COMPONENT ALKALI METAL SILICATE CEMENT COMPOSITION

[75] Inventors: Josef Ernst, Eppstein/Taunus; Hans J. Semmler, Hochheim am Main; Peter Wirtz, Königstein/Taunus, all of Fed. Rep. of Germany

[73] Assignee: Hoechst Aktiengesellschaft, Fed. Rep. of Germany

[21] Appl. No.: 8,733

[22] Filed: Jan. 25, 1993

[51] Int. Cl.$^5$ .................. C04B 12/02; C04B 12/04
[52] U.S. Cl. .................. 106/630; 106/38.3; 106/38.35; 106/632; 106/634; 106/690; 106/691
[58] Field of Search .......... 106/38.3, 38.35, 690, 106/691, 629, 630, 632, 634

[56] References Cited

U.S. PATENT DOCUMENTS

| | | | |
|---|---|---|---|
| 3,445,257 | 5/1969 | Hloch | 106/629 |
| 3,669,699 | 6/1972 | Doi et al. | 106/629 |
| 4,319,926 | 3/1982 | Nowakowski et al. | 106/630 |
| 4,328,033 | 3/1982 | Boberski et al. | 106/629 |
| 4,482,380 | 11/1984 | Schlegel | 106/629 |
| 4,597,796 | 7/1986 | Ernst et al. | 106/630 |

FOREIGN PATENT DOCUMENTS 87529 7/1976 Japan .

*Primary Examiner*—Mark L. Bell
*Assistant Examiner*—Michael Marcheschi
*Attorney, Agent, or Firm*—Connolly & Hutz

[57] ABSTRACT

The invention relates to a dry, surfactant-free single-component alkali metal silicate cement composition containing as hardening agent condensed aluminum phosphate and at least one compound from the group comprising the ortho- and pyrophosphates of manganese, zinc, cobalt, iron(III) and chromium(III) and in addition containing the conventional components rounded quartz sand, clay, kieselguhr, mineral oil and solid powdered sodium water glass or potassium water glass.

3 Claims, No Drawings ns to U.S. Pat. No.
SINGLE-COMPONENT ALKALI METAL SILICATE CEMENT COMPOSITION The present invention relates to a dry, surfactant-free single-component alkali metal silicate cement composition suitable for preparing acid-resistant cementing adhesives and acid-resistant mortar compounds, but also for application using concrete-spraying machines, in particular by the Torkret method.

The aforementioned acid-resistant cementing adhesives can serve not only for application using concrete-spraying machines, but also for masonry construction, pointing and laying of acid-resistant blocks and slabs.

EP-B-0,133,953 (corresponding to U.S. Pat. No. 4,597,796) has already disclosed a dry, surfactant-free single-component alkali metal silicate cement composition containing the following components:
a) metal phosphate hardening agents in quantities between 2 and 10% by weight
b) rounded quartz sand with a grain size between approximately 0.03 and 0.5 mm in quantities of 30-70% by weight,
c) clay components in quantities of 10-40% by weight,
d) kieselguhr in quantities of 1-5% by weight,
e) mineral oil in quantities of 0.05-1% by weight,
f) solid powdered sodium water glass or potassium water glass or mixtures thereof in quantities of 10-25% by weight.

The metal phosphate hardening agents here are condensed aluminum phosphates according to U.S. Pat. No. 3,445,257 (DE-C-1,252,835) or condensed iron-/aluminum phosphates according to U.S. Pat. No. 4,482,380 (DE-A-3,133,354).

It has now been found that a single-component alkali metal silicate cement composition with significantly improved properties is obtained if, instead of one of the two hardening agents mentioned above, a mixture of condensed aluminum phosphate with certain non-condensed ortho- or pyrophosphates is used. That is to say, the condensed aluminum phosphate is mixed with at least one phosphate from the group comprising the ortho- and pyrophosphates of manganese, zinc, cobalt, iron(III) and chromium(III). Such a mixed hardening agent has significantly better properties than a hardening agent comprising only condensed aluminum phosphate according to EP-B-0,133,953. Furthermore, such a mixed hardening agent has properties at least as good as the condensed iron/aluminum phosphate hardening agent also described in EP-B-0,133,953, which, however, because of the necessary condensation of the iron component, is much more difficult to prepare than the mixed hardening agent according to the invention.

The invention therefore relates to a dry, surfactant-free single-component alkali metal silicate cement composition which comprises the following components:
a) condensed aluminum phosphate in quantities of 2-10% by weight
b) at least one compound from the group comprising the ortho- and pyrophosphates of manganese, zinc, cobalt, iron(III) and chromium(III) in quantities of 0.5 to 8% by weight
c) rounded quartz sand with a grain size of 0.01-0.5 mm in quantities of 30-70% by weight
d) clay in quantities of 10-40% by weight
e) kieselguhr in quantities of 1-5% by weight
f) mineral oil in quantities of 0.05-1% by weight and
g) solid powdered sodium water glass or potassium water glass or mixtures thereof in quantities of 10-25% by weight.

Component b) is preferably an ortho- or pyrophosphate of manganese, zinc or iron(III), in particular manganese orthophosphate $Mn_3(PO_4)_2$.

The condensed aluminum phosphate is prepared for example according to U.S. Pat. No. 3,445,257. The clay used should be dry. Kaolin clay is preferred. The kieselguhr used is preferably not calcined. The molar ratio $SiO_2$/alkali metal oxide should be approximately 1-1.5 in the case of potassium water glass and 2.0 to 3.3 in the case of sodium water glass. Approximately 2.5 to 3.5 parts of sodium water glass or 3.5 to 4.5 parts by weight of potassium water glass are preferred per part by weight of hardening agent (that is to say components a) and b) together).

In the round quartz sands used, the so-called angularity ratio should be below 1.5, preferably below 1.4. Angularity ratio is taken to mean the ratio of the measured surface area to the theoretical surface area, the theoretical surface area being taken to be the surface area of spherical particles of the same volume calculated from the grain spectrum.

A dry single-component cement composition according to the invention can be prepared as follows: Selected quartz sands with an average grain size of 0.01 to 0.5 mm, preferably approximately 0.1 to 0.23 mm are carefully mixed together with the hardening agent, the clay and the kieselguhr and sprayed with a small quantity of machine oil. Separately from this, a mixture of waterglass powder of the desired quality is also sprayed with a small quantity of machine oil. The two sprayed partial amounts are then carefully mixed. The separate spraying serves to separate the surface of the alkali metal silicate from the surface of the hardening agent. Mineral oils used, normally conventional machine oils, must therefore be inert both with respect to the alkali metal silicate as well as with respect to the hardening agent used. However, any conventional mineral oil meets this requirement.

If the cement composition according to the invention is to be processed by the Torkret method, it is preferred for the rounded quartz sand to have grain sizes of 0.06-0.32 mm, in particular of 0.1-0.23 mm. In this case amounts of quartz sand between 40 and 58% by weight are preferred. In the choice of the rounded quartz sand, of the clay and of the kieselguhr, care should be taken that practically no fines below 30 microns are contained therein, since these could act as silicogenic dust.

In the Torkret method a quick-setting, water-containing single-component cement is applied in thicknesses of approximately 0.8 to 1.2 cm to horizontal, inclined or vertical surfaces, where it sets. The water-containing cement is prepared by introducing dry alkali metal silicate cement into the feed compartment of a concrete gun or concrete-spraying machine, pressurizing the feed compartment with compressed air, transferring the dry cement in metered quantities from the feed compartment by means of a material supply hose to the spraying machine nozzle and introducing spraying water from a pressurized water supply line into the spraying machine nozzle, in order to mix the water with the cement there. The mixture of alkali metal silicate cement and water is applied to the pre-treated surfaces, for example by means of a hose. The cement requires several minutes to set on the surfaces. When the single-component alkali metal cements according to the invention are used, the coatings are acid-resistant and very highly resistant to thermal shock.

The use of the dry single-component alkali metal silicate cement composition according to the invention is especially interesting for the production of corrosion-preventing protective layers on steel surfaces which are subject to relatively high temperatures. Such protective layers are used successfully as interior linings for quenchers in refuse incineration plants, regenerators (air heaters in blast furnaces), hot air lines and in gas coolers.

The regenerators are generally approximately 10 m in diameter and 50 m in height. For coating, first the entire interior steel surface is cleaned, a cement/water mixture is subsequently applied by machine from top to bottom, dry-delivery spraying machines being used. These types of machine permit continuous, uniform spraying and allow uninterrupted work. The entire sprayed layer is applied in a thickness of approximately 8 to 12 mm in regenerators. In a similar manner the interior lining of chimney heads made of steel can be carried out with the aid of the cement composition according to the invention.

The amount of rebound material (not adhering to the steel surface), the occurrence of dust and the compaction of the sprayed layer are dependent on the length and the hydrostatic height of the material transport hose. The amount of rebound material is furthermore dependent on the material composition, the spraying machine, the adhesiveness of the substrate, the ventilation of the work site and the uniformity of the application, that is to say the experience of the operating personnel. The water must be uniformly and carefully metered in so that no pockets with different distribution of water and solid proportions form. Vibration should be avoided between application of the sprayed layer and hardening, since otherwise there is the danger that the material will slide off while still wet or that debonding of the set coating will occur after a few days.

The invention is explained in greater detail by the examples below.

EXAMPLES

The dry cement compositions below were treated with water and processed to form cementing adhesives. Using the set adhesives, the value of the Shore D hardness and the time after which the cementing adhesive was water resistant were determined. The hardening agents I, II, III, IV and V used are defined further below in the comparative examples and examples.

Composition A 17.0% by weight of waterglass powder (27% $Na_2O$, 54% $SiO_2$, 19% $H_2O$)
0.3% by weight of machine oil
20.0% by weight of ultra-fine clay
2.0% by weight of kieselguhr
5.7% by weight of hardening agent I, II, III, IV or V
55.0% by weight of quartz sand The quartz sand is composed of rounded and washed sands with an average grain size of 0.15 mm and those with an average grain size of 0.23 mm approximately in the ratio of 1:2. The angularity ratio was below 1.4.

To prepare the cementing adhesive compound, 100 parts by weight of composition A were mixed with 14 parts by weight of water.

Composition B 13.6% by weight of waterglass powder (27% $Na_2O$, 54% $SiO_2$, 19% $H_2O$) 3.4% by weight of waterglass powder (28% $K_2O$, 56% $SiO_2$, 16% $H_2O$) 0.3% by weight of machine oil 23.0% by weight of ultra-fine clay 2.0% by weight of kieselguhr 6.0% by weight of hardening agent I, II, III, IV or V 51.7% by weight of quartz sand as in composition A To prepare the cementing adhesive compound, 100 parts by weight of composition B were mixed with 18 parts by weight of water.

COMPARATIVE EXAMPLE 1

5.7 % by weight of hardening agent I=condensed aluminum phosphate according to EP-B-0 133 953 were used to prepare the composition A/I and this was then mixed with water (14 parts by weight per 100 parts by weight of A/I) to form a cementing adhesive. Composition B/I was prepared analogously with 60% by weight of hardening agent I and then mixed with water (18 parts by weight per 100 parts by weight of B/I) to form cementing adhesive. The values found for Shore D hardness and the time after which the cementing adhesive was water resistant can be seen in the table.

COMPARATIVE EXAMPLE 2

The same applies as in Comparative Example 1, except that instead of hardening agent I hardening agent II=condensed iron/aluminum phosphate according to EP-B-0 133 953 was used.

EXAMPLE 1

The same applies as in Comparative Example 1, except that instead of hardening agent I hardening agent III=mixture of condensed aluminum phosphate (5.2% by weight for A/III or 5.5% by weight for B/III) and manganese orthophosphate $Mn_3(PO_4)_2$ (0.5% by weight for A/III and for B/III) was used.

EXAMPLE 2

The same applies as in Comparative Example 1, except that instead of hardening agent I, hardening agent IV=mixture of condensed aluminum phosphate (5.2% by weight for A/IV or 5.5% for B/IV) and zinc phosphate (0.5% by weight for A/IV and for B/IV) was used.

EXAMPLE 3

The same applies as in Comparative Example 1, except that instead of hardening agent I, hardening agent V=mixture of condensed aluminum phosphate (5.2% by weight for A/V or 5.5% by weight for B/V) and iron(III) phosphate (0.5% by weight for A/V and for B/V) was now used.

| | Comparative Example 1 (Condensed aluminum phosphate) Hardening agent I | Comparative Example 2 (Condensed iron-aluminum phosphate) Hardening agent II | Example 1 Hardening agent III | Example 2 Hardening agent IV | Example 3 Hardening agent V |
|---|---|---|---|---|---|
| Addition of ortho- or | — | — | 0.5% by weight of | 0.5% by weight of | 0.5% by weight of |

|  | Comparative Example 1 (Condensed aluminum phosphate) Hardening agent I | | Comparative Example 2 (Condensed iron-aluminum phosphate) Hardening agent II | | Example 1 Hardening agent III | | Example 2 Hardening agent IV | | Example 3 Hardening agent V | |
| --- | --- | --- | --- | --- | --- | --- | --- | --- | --- | --- |
| pyrophosphate |  |  |  |  | manganese phosphate | | zinc phosphate | | iron(III) phosphate | |
| Cement composition | A | B | A | B | A | B | A | B | A | B |
| Mixing ratio cement:water | 100:14 | 100:18 | 100:14 | 100:18 | 100:14 | 100:18 | 100:14 | 100:18 | 100:14 | 100:18 |
| Processing time | 70 min | 140 min | 60 min | 100 min | 45 min | 60 min | 50 min | 100 min | 60 min | 90 min |
| Shore D after |  |  |  |  |  |  |  |  |  |  |
| 24 h | 25 | — | 40 | — | 40 | 25 | 35 | 20 | 30 | 15 |
| 48 h | 50 | 15 | 45 | 30 | 60 | 50 | 45 | 40 | 50 | 40 |
| Water resistant for days | 12 | 24 | 4 | 10 | 2 | 4 | 6 | 12 | 8 | 12 |

EXAMPLE 4

A dry single-component cement composition was prepared according to the following formulation:
17.0% by weight of waterglass powder (28% $K_2O$, 56% $SiO_2$, 16% $H_2O$)
0.3% by weight of machine oil
0.3% by weight of plaster of Paris
5.4% by weight of hardening agent (4.9% by weight condensed Al phosphate and 0.5% by weight $Mn_3(PO_4)_2$)
1.0% by weight of kieselguhr
16.0% by weight of fine clay
60.0% by weight of quartz sand as in Comparative Example 1

This dry cement composition was filled into the hopper of a spraying machine (rotor machine with revolver system of type Aliva-242 of Aliva AG, Widen, Switzerland) and guided to the rotor via a star-type agitator. The rotor chambers transported the still pulverulent mixture to the outlet, where it was fed to the nozzle by an air current. In the spray nozzle 18 to 20 parts by weight of water were metered into 100 parts by weight pulverulent mixture under a pressure of 3 to 4 bar and mixed. The cementing adhesive was sprayed onto the sand-blasted sheet metal wall to be coated in one operation by the compressed air, which was applied to the feed compartment. The cementing adhesive hardened within 24 hours at 20° C. Approximately 18 kg of the dry preparation as well as approximately 3.4 kg of water were treated required to coat 1 m² of surface in a layer thickness of 10 mm. The steel surface thus prepared with a coating of 1-2 cm was resistant to organic and inorganic acids, with the exception of hydrofluoric acid and concentrated phosphoric acid at very high temperatures. Furthermore, this covering was resistant to oils, solvents and greases as well as to oxidants. It did not withstand strongly alkaline attack.

We claim:

1. A dry, surfactant-free single-component alkali metal silicate cement composition, which comprises the following components:
   a) condensed aluminum phosphate in quantities of 2-10% by weight
   b) at least one compound from the group comprising the ortho- and pyrophosphates of manganese, zinc, cobalt, iron(III) and chromium(III) in quantities of 0.5 to 8% by weight
   c) rounded quartz sand with a grain size of 0.01-0.5 mm in quantities of 30-70% by weight
   d) clay in quantities of 10-40% by weight
   e) kieselguhr in quantities of 1-5% by weight
   f) mineral oil in quantities of 0.05-1% by weight and
   g) solid powdered sodium water glass or potassium water glass or mixtures thereof in quantities of 10-25% by weight.

2. A composition as claimed in claim 1, wherein component b) is an ortho- or pyrophosphate of manganese, zinc or iron(III).

3. A composition as claimed in claim 1, wherein component b) is manganese orthophosphate.

* * * * *